United States Patent
Karakotsios et al.

(10) Patent No.: US 8,683,054 B1
(45) Date of Patent: Mar. 25, 2014

(54) COLLABORATION OF DEVICE RESOURCES

(75) Inventors: Kenneth M. Karakotsios, San Jose, CA (US); Isaac S. Noble, Soquel, CA (US)

(73) Assignee: Amazon Technologies, Inc., Reno, NV (US)

( * ) Notice: Subject to any disclaimer, the term of this patent is extended or adjusted under 35 U.S.C. 154(b) by 210 days.

(21) Appl. No.: 13/215,591

(22) Filed: Aug. 23, 2011

(51) Int. Cl.
G06F 15/16 (2006.01)

(52) U.S. Cl.
USPC ............... 709/228; 348/47; 348/48; 709/208

(58) Field of Classification Search
USPC ........................................................ 709/228
See application file for complete search history.

(56) References Cited

U.S. PATENT DOCUMENTS

| 7,605,837 | B2 * | 10/2009 | Yuen et al. | 348/14.16 |
| 7,675,539 | B2 * | 3/2010 | Matsui | 348/14.08 |
| 8,063,938 | B2 * | 11/2011 | Ueki | 348/208.16 |
| 2009/0210789 | A1 * | 8/2009 | Thakkar et al. | 715/719 |
| 2010/0306335 | A1 * | 12/2010 | Rios et al. | 709/211 |
| 2011/0109726 | A1 * | 5/2011 | Hwang et al. | 348/47 |
| 2012/0124603 | A1 * | 5/2012 | Amada | 725/10 |

* cited by examiner

Primary Examiner — Tauqir Hussain
(74) Attorney, Agent, or Firm — Novak Druce Connolly Bove + Quigg LLP

(57) ABSTRACT

Computing devices can collaborate in order to take advantage of various components distributed across those devices. In various embodiments, image information captured by multiple devices can be used to identify and determine the relative locations of various persons and objects near those devices, even when not every device can view those persons or objects. In some embodiments, one or more audio or video capture elements can be selected based on their proximity and orientation to an object to be captured. In some embodiments, the information captured from the various audio and/or video elements can be combined to provide three-dimensional imaging, surround sound, and other such capture data.

27 Claims, 7 Drawing Sheets

COLLABORATION OF DEVICE RESOURCES

BACKGROUND

As the number of people utilizing portable computing devices increases, and as the variety of types of computing devices increases, there comes a increasing need to adapt the ways in which users of these devices obtain and communicate information. For example, a user wishing to share electronic information with a specific person of a group of nearby people often must obtain certain information, such as an email address or network address, in order to send the information to the correct person. Even when a wireless connection can be obtained between devices to be used for the sharing, it still is necessary for the user to determine which device corresponds to a specific person to receive the information, and the user can still be required to obtain an identifier or otherwise enter access information in order for the devices to connect and share information.

Further, the user might want to record a meeting in which multiple people are involved. In many cases, a user wanting to record a meeting with a computing device such as a tablet computer or smart phone will be unable to capture image information about each person in the room unless the user is holding and moving the device, which can be undesirable in many instances. Further, if the user wants to record audio information the device might not be sufficiently near a person speaking to enable the device to adequately record the speaker's voice, particularly if there is a lot of background noise.

BRIEF DESCRIPTION OF THE DRAWINGS

Various embodiments in accordance with the present disclosure will be described with reference to the drawings, in which.

DETAILED DESCRIPTION

Figure 1:
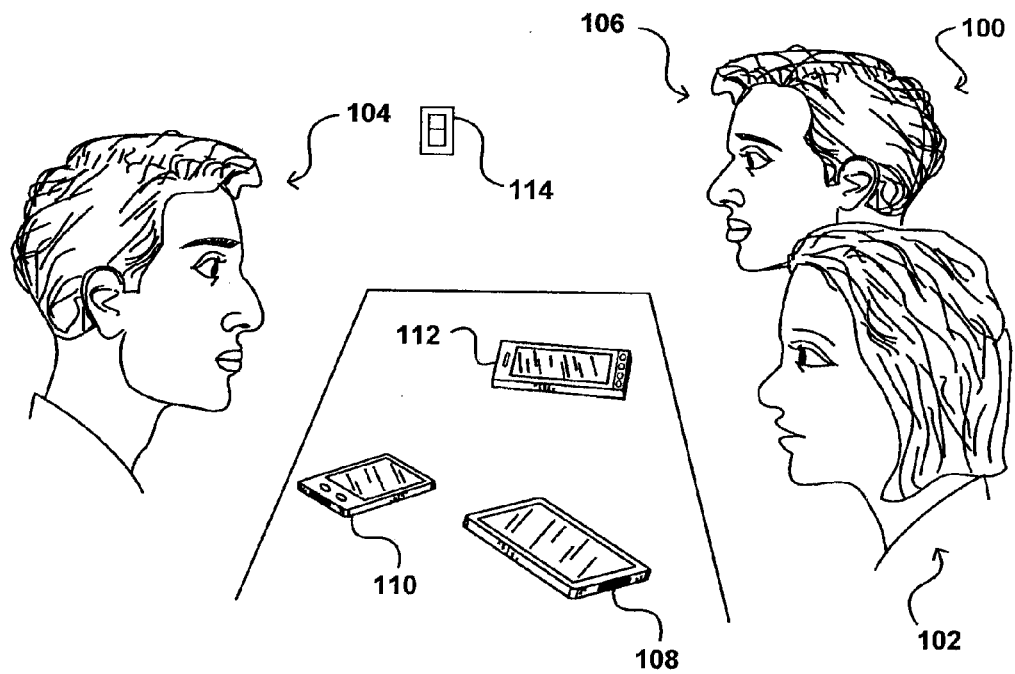
FIG. 1 illustrates an example situation wherein there are multiple computing devices and multiple persons in the same room that can be analyzed in accordance with various embodiments.

Systems and methods in accordance with various embodiments of the present disclosure may overcome one or more of the aforementioned and other deficiencies experienced in conventional approaches to interacting with various users and/or devices in an electronic environment. In particular, various embodiments enable multiple computing devices to communicate and share resources in order to improve one or more functions of the devices, such as audio or video capture. Further, the computing devices can use information available from other devices, such as images obtainable only from the other devices, to determine the relative positions of one or more objects or persons with respect to each computing device. In at least some embodiments, information obtained from the various devices can be aggregated to generate a three-dimensional mapping of the surroundings in order to provide direction, identification, and other such information to the various devices. Further, input can be provided to a given device when that input can only directly be captured by a separate device.

In one embodiment, a group of computing devices in a room can each concurrently capture image information of nearby objects from the perspective of one or more image capture elements of each device. The captured image information can be used to generate a shared view of the room, where any object in the room can be imaged as long as that object is within the capture area of at least one imaging element of at least one computing device. In some embodiments, this information can be used to determine an ordering or relative position of one or more users in the room with respect to each computing device. In other embodiments, a two- or three-dimensional mapping can be generated by aggregating the information from the multiple cameras and then determining a relative distance, direction, and/or position of the various objects and/or persons in the room with respect to the various devices. Using an appropriate technology such as image analysis, for example, the computing devices can work together to attempt to determine a relative position of each person, object, and/or computing device, such as by triangulating or otherwise calculating a location of the various objects or persons in one or more images captured by the computing devices. This information can be used to help users send information to the proper person, be able to view identifying information about each person in the room based upon a facial recognition process, and other such actions.

In at least some embodiments, the ability to share resources and information among devices can enable information to be determined that might not otherwise be determinable by a single device. For example, a given device might not have a sufficient view of a person across the room to perform facial recognition or receive gesture input. If, however, that device is able to communicate with another device that has a clear and adequate view of that person, the other device can capture the information enabling the facial recognition or gesture input to be provided to the first device. Such an approach can also be beneficial, as a computing device does not need to be held directly in front of a person's face in order to perform facial recognition, and thus can be less intrusive.

Similarly, if there are multiple persons in a room that are desired to be video recorded at different points in time, such as when each person is speaking, the ability to determine and select the best camera at any given time to capture the information can enable multiple camera angles without having to manually reposition a given device. Similarly, audio recording can be performed by dynamically selecting a microphone or other audio capture element that is closest to an audio source, such as a current speaker in a meeting. In at least some embodiments, audio information captured by other devices can be used to filter out the background noise coming from other directions.

Various other applications, functions, and advantages are presented below with respect to the various embodiments. It should be understood that the description and figures provide a number of examples, but the alternatives and variations possible within the scope of the various embodiments are not fully described. These alternatives and variations, however, would be apparent to one of ordinary skill in the art in light of the teachings and suggestions contained herein.

FIG. 1 illustrates an example situation 100 wherein there are three users 102, 104, 106 in a meeting, each of whom has brought a portable computing device 108, 110, 112. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In such a situation, there might be any of a number of different interactions that one of those users might want to have with a particular device. In one example, a user 104 might want to obtain identifying information for the other two users 102, 106, and be able to send information to a device for one of those users based on the user's identify. The identifying information can be obtained by a process such as facial recognition, which then can be correlated with that user's position by tracking that user in the image information. The identifying information can be obtained from a central source based on the facial recognition, from a device associated with that user, or from any other appropriate source. Examples of such a determination can be found, for example, in co-pending U.S. patent application Ser. No. 12/763,118 filed Apr. 19, 2010, and entitled "Approaches for Device Location and Communication," which is hereby incorporated herein by reference.

In order to perform conventional facial recognition, however, the user's device 110 must be positioned such that an imaging element of the device is substantially in front of another person's face. Such an approach can be intrusive, particularly when a person is speaking and another user is holding a device up in front of that person's face. In the situation of FIG. 1, the one or more imaging elements of the user's device 110 might not be able to see the faces of the other users 102, 106, at least from an angle necessary to perform facial recognition. Thus, the user 104 would not be able to perform facial recognition of both the other users without manually repositioning the device 110. Further, even if the user manually repositions the device to be able to perform facial recognition on the other users, the device will not be able to track the relative positions of those users unless both users remain within the capture area of the imaging element(s) of the device.

Systems and methods in accordance with the various embodiments take advantage of the fact that various computing devices can communicate wirelessly, or via other connections, and are able to share information without manual intervention. For example, consider the situation 200 in FIG. 2, where capture directions of various imaging elements of the devices are illustrated by arrows towards specific objects. It should be understood that reference numbers are carried over between figures for simplicity of explanation, and that such usage should not be interpreted as a limitation on the scope of the various embodiments. In this example, it can be seen that the computing device 110 of the interested user 104 is able to capture image information about one user 106 but not the other 102. Even so, the computing device might be too far or off-center from that user 106 to be able to adequately capture information needed for facial recognition.

Figure 2:
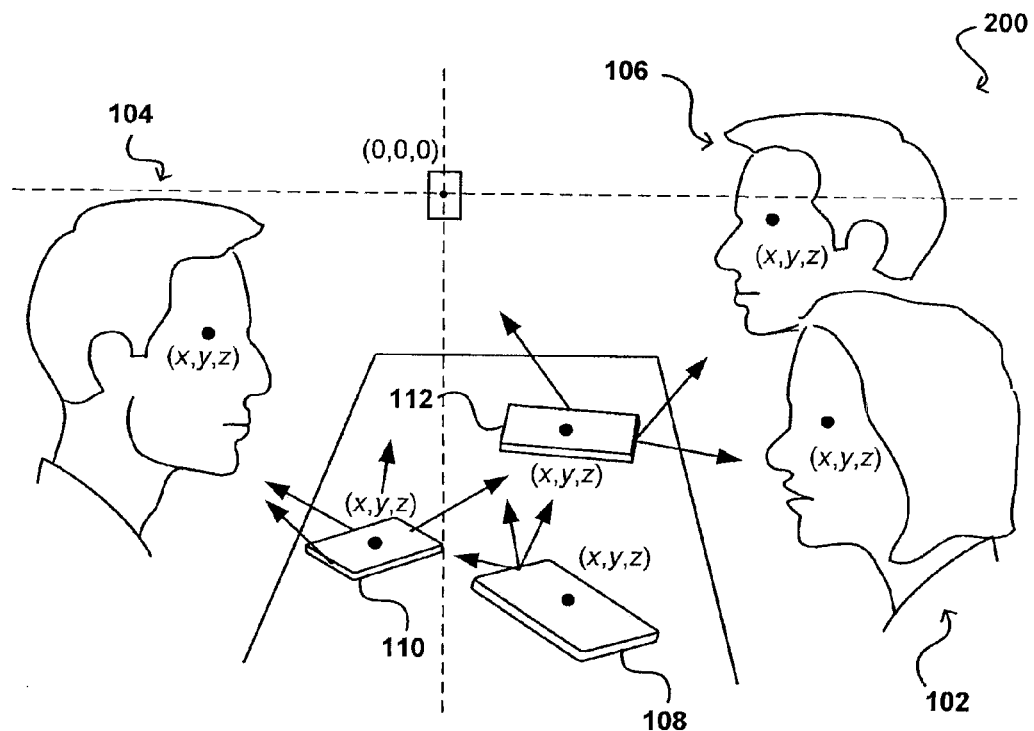
FIG. 2 illustrates an example of a mapping approach that can be used with the situation of FIG. 1 in accordance with various embodiments.

As illustrated in FIG. 2, however, for the same configuration as illustrated in FIG. 1, one of the devices 112 is able to capture information about both of the other users 102, 106. Accordingly, if the devices 110, 112 are able to communicate, image information from the closer device 112 can be used to provide identifying information for each of those users 102, 106 to the device 110, either by sending the image information or performing facial analysis and sending the identity information to the device 110. If the first device was able to determine the identity of one of the users 106, the device might request information for the other user 102 that cannot be imaged by the device based on the current relative orientation.

Such information enables the first device 110 to determine the identity of the other users in the room, assuming identifying information is available for those users. Similarly, the other devices can obtain identifying information for the first user 104 by using image information captured by that user's device 110 if the respective devices are not able to adequately capture an image of that user for facial recognition. Each device thus can determine the identity of each person in the room independent of how many of those people can actually be imaged by a given device. In some embodiments, each device might attempt to determine the identity of as many people in the room as possible, then the devices will compare the determinations to attempt to come to a consensus as to the identities of those persons.

While the identifying information can be helpful in at least some situations, a user might not be able to correlate the provided names or other identifying information with the actual people sitting around the room. For example, a picture might not be provided with the facial information, people might move, etc. Thus, it can be desirable in at least some situations to also determine a relative position of each of those users, such that the identifying information can actually be correlated with specific persons in the room. As discussed, however, a device might not be able to clearly view each person in the room, such that the locations of those persons cannot be determined.

As discussed, however, the computing devices 108, 110, 112 are able to share information such as captured image information. If at least one of the computing devices is able to view the position of a person in image information captured by that device, the relative position (at least direction) of that user with respect to the device can be determined. If that device is able to image one of the other devices at substantially the same time, or is at least able to view one object in common with the other device, then the approximate location of that person can be determined with respect to both devices.

For example, device 110 is able to view user 106 but not user 102. Device 112 is able to view both user 106 and user 102. Further, device 110 can view device 112. By combining this information, device 110 can determine the relative position of user 102 even though device 110 cannot view user 102 through any respective imaging element. If multiple cameras or imaging elements are able to capture the same object, then triangulation or another such approach can be used to also determine an approximate distance to that object.

In some situations such as that illustrated in FIG. 1, there can be at least one object that is viewable by each of the devices 108, 110, 112. In this example, each of the devices is able to view a light switch 114 in the room. In at least some embodiments, the devices can select one such object (using one or more image quality, position accuracy, and/or consensus algorithms) to act as a frame of reference for each device. In the example of FIG. 2, a point on the switch (i.e., near the center) can be selected as a center point or frame of reference for use in mapping the relative locations of users and/or objects in two or three dimensions. In this example, at least one relative coordinate (here, (x, y, z) in three dimensions) is determined for each of the users and devices with respect to the position of the light switch. As long as any of the devices is able to view one of those objects, the device can determine the relative position of each of the users and objects, assuming the light switch is viewable by at least one of the devices, and each object or user is also viewable by at least one of the devices, although in some embodiments three-dimensional mapping requires each object to be viewable by at least two different cameras, a camera and a distance determining element, or another such combination as known for determining relative position. Further, the relative position of any of these users or objects can be tracked as long as at least one imaging element is able to capture the updated relative position, and that information is able to be shared with the other devices. The relative position can also be updated to reflect any change in orientation of a given device, as long as at least one of the objects or users is still able to be viewed by the device.

Figure 3A:
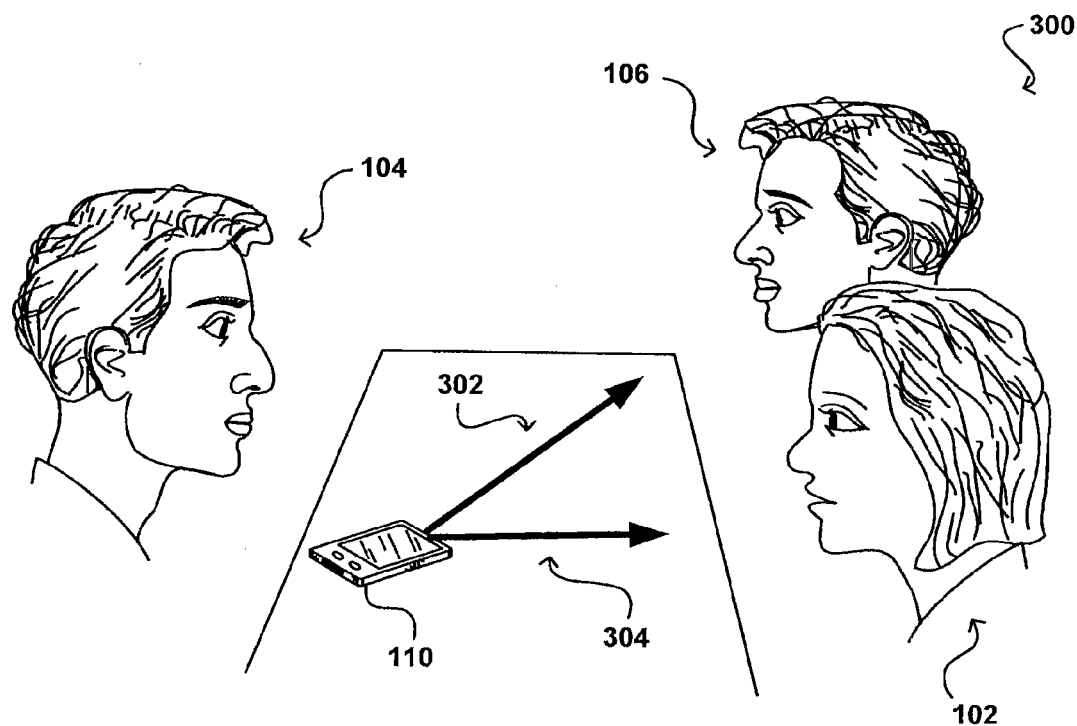
FIGS. 3(a) and (b) illustrate an example approach to utilizing determined position information in accordance with one embodiment.
Figure 3B:
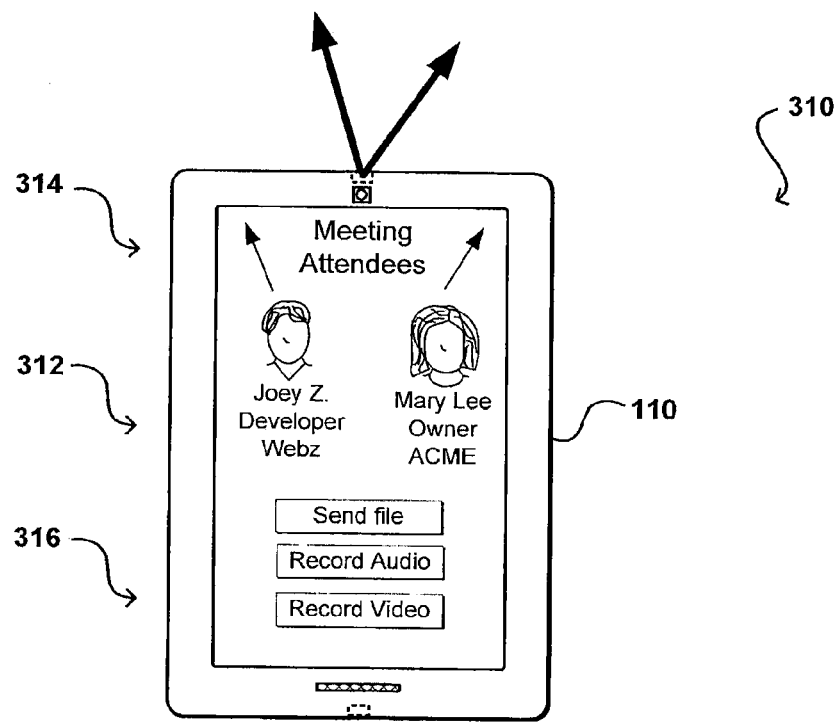

Once the relative positions and identities of the various users have been determined, that information can be used to assist a user of one of the computing devices. For example, FIG. 3(a) illustrates a simplified view showing only the computing device 110 of the first user 104, although it should be understood that the other devices can be used to determine position information as discussed previously. In this example, the device is able to determine the relative position or direction 302 of one user 106 and the relative position or direction 304 of the other user 102. As discussed, the device 110 might not be able to actually view one of the users 102 in captured image information, but is able to get that information from another device (not shown). FIG. 3(b) illustrates an example interface presentation 310 that can be provided on the device 110 in accordance with at least one embodiment. Since the relative position and identity of each of the other users has been determined, images 312 of those users can be displayed on a display element of the device in the approximate position of those users with respect to the device 110. In some embodiments, arrows 314 or other such elements might also be displayed to more clearly identify the persons at each respective position. In this case, the user of the device 110 might not know the name of a user or information about that user's device, but can select an icon or image associated with that user to perform an action with respect to that user. For example, in FIG. 3(b) there are several user-selectable elements 316 that enable the user to perform various options. In this case, a user can send a file to a device associated with another person, record audio or video of a specific person, or perform another such action. Based on the determined position and identity, the device 110 can determine the optimal approach to perform the selected option.

For example, a user might select the image for Mary Lee and then select an option to send a file. Since identifying information has been obtained for that person at that location, which can be used to determine a device associated with Mary Lee, the computing device can determine the device associated with Mary Lee and send the file to that device, whether wirelessly or otherwise. Similarly, if the user selects to record audio or video of Joey Z., the computing device 110 can determine one or more appropriate elements to perform the audio and/or video capture on one or more of the nearby devices. As mentioned, the relative position of the images 312 and direction of the arrows 314 can be updated in response to movement of those persons, movement of the device 110, or changes in the orientation of the device 110, which can affect the relative positions on the display as should be apparent in light of the present disclosure.

Figure 4:
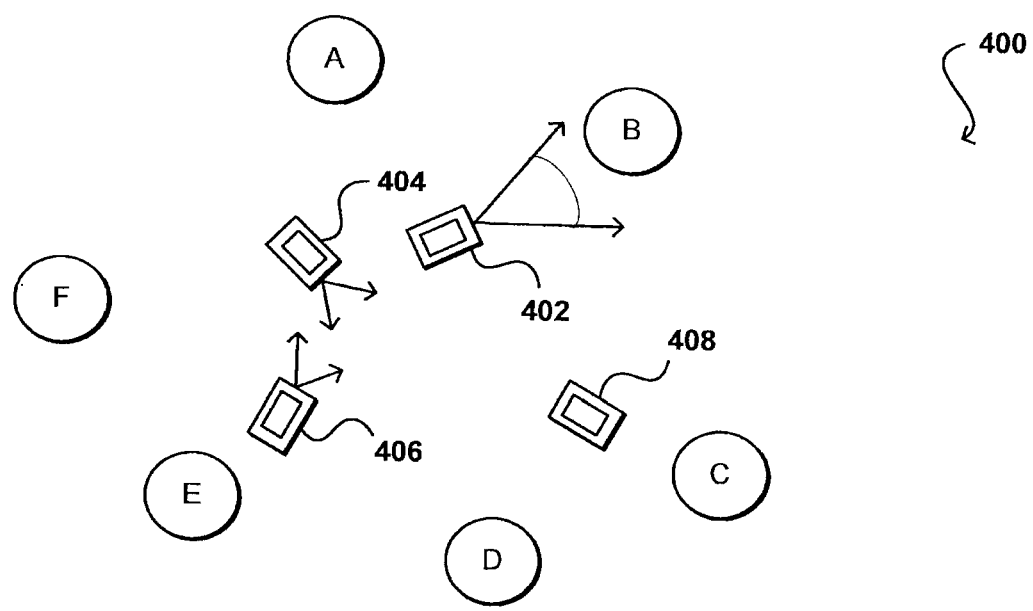
FIG. 4 illustrates an example situation wherein multiple devices are able to communicate to optimize video capture in accordance with various embodiments.

In one example, FIG. 4 illustrates an example situation 400 wherein there are six users (A-F) scattered about an area including four computing devices 402, 404, 406, 408. In this simplified example, each device includes a single image capture element, although each device can include multiple such elements as discussed elsewhere herein. In this example, a user might want to capture video of user B. The devices can each know the relative location of user B, as discussed previously, and can attempt to come to a consensus as to the optimal camera to use to capture video of user B. In this example, device 404 would not be selected as user B is not within the capture area of device 404. While user B is within the image capture range of device 406, device 402 also is able to image user B and is closer to user B such that the element of device 402 may be selected (although other criteria such as angle, clarity, obstructions, etc., can be used as well within the scope of the various embodiments). In this example, the devices want to minimize resource usage (and thus battery power) and capture only a single video feed at any given time if that feed is able to adequately capture the desired information. In some embodiments, image information from multiple devices can be captured concurrently and then stitched together, such as where all attendees of a meeting or actors in a performance are to be filmed during the time of capture. For example, video captured from multiple cameras and/or multiple devices can be stitched together to provide a larger overall video image, a larger capture area, or a higher quality video image. In other embodiments, the video from multiple devices might be combined into a single file such that different views can be obtained as may be controlled by a user. For example, during a presentation there might be several people talking, and a viewer of a video file captured during the meeting might want to be able to control the view at any given time, such as whether to see the presentation, a current speaker, a reaction of another in the room, etc. For this or any other combination of information discussed herein, the combination can be performed on any of the devices capturing information or distributed across those devices, or can be performed by a remote system or service, such as a third party entity or cloud provider.

Figure 5:
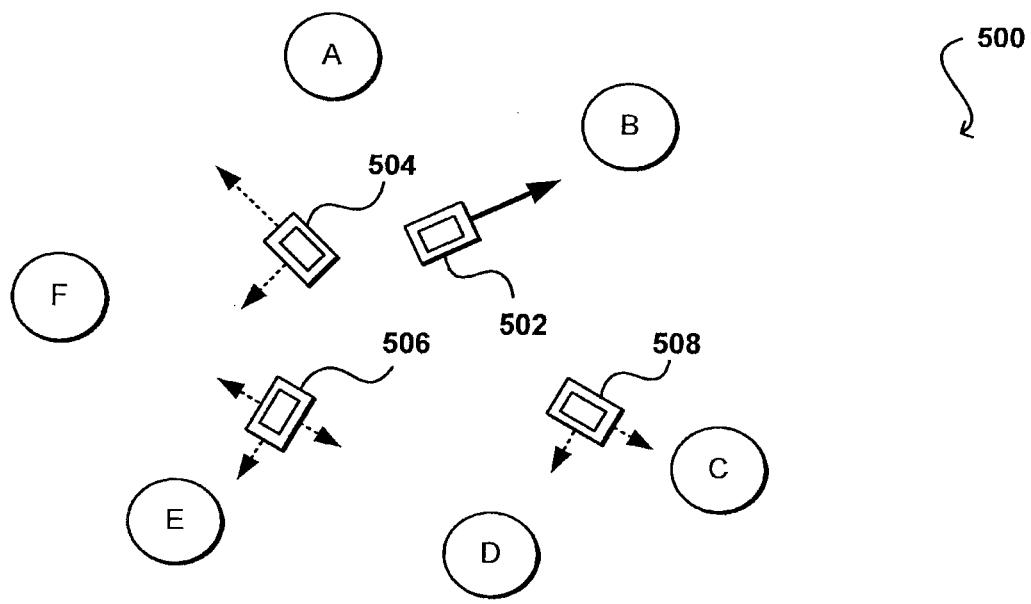
FIG. 5 illustrates an example situation wherein multiple devices are able to communicate to optimize audio capture in accordance with various embodiments.

Similarly, FIG. 5 illustrates an example situation 500 wherein there again are six users (A-F) scattered about an area including four computing devices 502, 504, 506, 508. In this example, however, the devices intend to capture audio from a current speaker using an audio capture element that is likely to provide the highest quality audio recording. In this example, the devices can utilize the determined relative positions to determine that device 502 is closest to user B, and thus the microphone closest to user B should be used to record audio while user B is speaking or otherwise providing audio content. In at least some embodiments, the devices can also determine any audio capture elements at a distance from user B and/or facing away from user B that can be used to capture audio primarily from other locations or directions. For example, devices 504, 506, and 508 are each shown to capture audio in different directions away from user B, as indicated by the dotted arrows. In at least some embodiments, a weighted amount of the sound captured from any of all of these devices can be subtracted or otherwise removed from the audio captured from device 502 of user B, which can remove background noise and/or otherwise filter out noise that is not produced by user B.

In some embodiments, the audio capture elements can work together to provide for audio capture in surround sound or with another such directionality. As known in the art, multiple audio capture elements can be used to provide acoustic beamforming for audio transmission and/or reception. By combining the audio elements of multiple devices, directional recording and/or transmission can also be provided by the various devices. Further, the captured audio information can be combined with captured video information to provide an optimized media file. For example, as discussed above an optimal video capture element can be selected using a first approach and an optimal audio capture element can be selected using a second approach (or, in some embodiments, a similar approach). For a given person speaking, for example, this might result in elements from different devices being selected, such as where the closest device to that speaker might be able to capture audio but not video of that speaker based on a current orientation of the device relative to the speaker. Embodiments thus enable appropriate elements to be used to capture different types of information for a common source even when those elements are on different devices. In some embodiments, the selection can be done dynamically during a recording, for example, and then automatically stored as a single file at the end of the recording. In at least some embodiments, each user and/or device then can automatically receive a copy, link, or notification of the resulting file.

In some embodiments, the combining of information captured from multiple elements can result in a higher quality capture. For example, capturing image information using multiple cameras can be used to create a larger and/or potentially higher resolution image, and in some cases can be used to remove artifacts or obstructions of one of the cameras. For multiple audio capture elements, the sound can be captured in a multi-directional or "surround-sound" type approach, wherein at least some level of directionality is stored with the audio information. The additional audio streams also can be used to improve the quality of the audio capture, such as to filter out background noise. Similarly, multiple elements can be used for improved playback, as the directionally-captured sound can be replayed in a similar fashion, recreating the sound in the area at the time of the capture. Similarly, if there are multiple projection elements, the multi-directional image or video capture can be reproduced as well. Various other approaches can be utilized as well as should be apparent in light of the present disclosure.

The following represent various processes that can be utilized with multiple computing devices in accordance with various embodiments. It should be understood, however, that additional, fewer, or alternative steps can be performed in similar or alternative orders, or in parallel, within the scope of the various embodiments.

Figure 6:
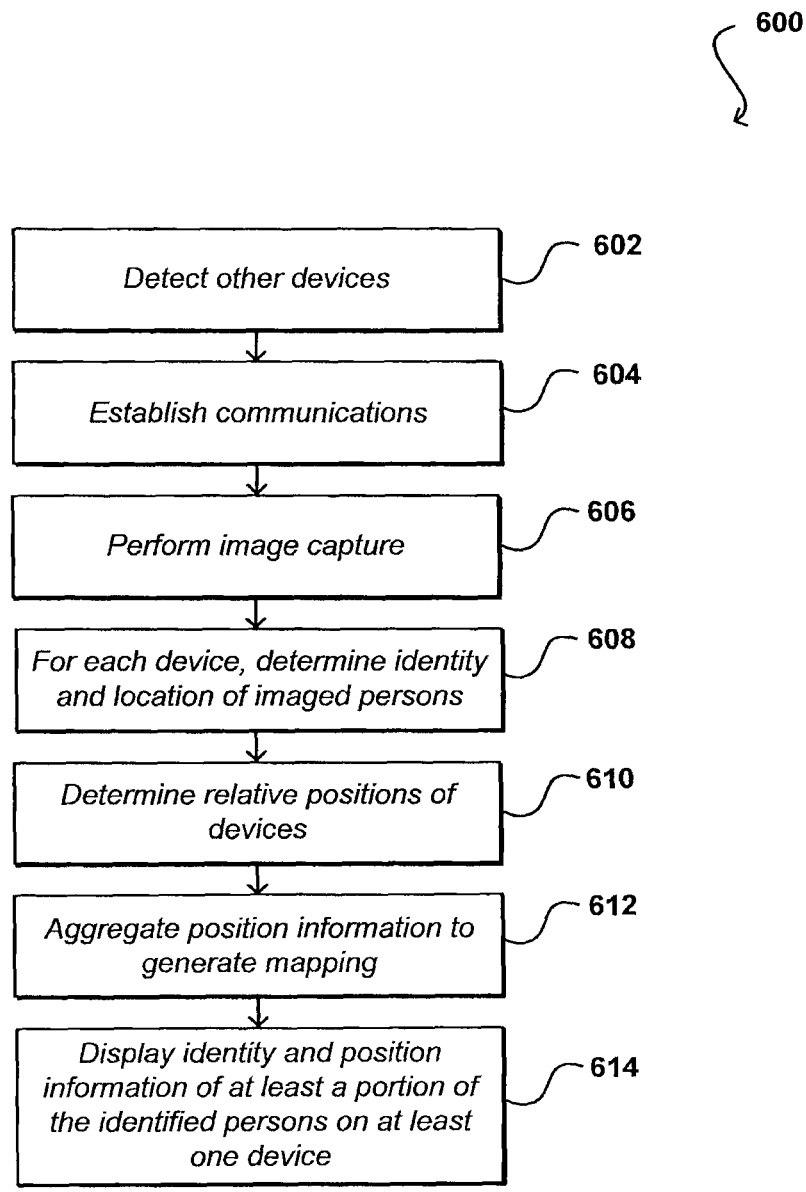
FIG. 6 illustrates an example process for determining relative positions of users using a plurality of devices that can be used in accordance with various embodiments.

FIG. 6 illustrates an example process 600 for determining the relative positions and identities of one or more users that can be utilized in accordance with various embodiments. In this example, a device detects one or more other devices 602, such as by coming within range of a wireless channel (e.g., Bluetooth or WiFi) utilized by one or more of those devices. The device then can attempt to establish communications using those wireless channels or another appropriate communication mechanism 604. Methods for establishing communications over a wireless channel are well known in the art and will not be discussed in detail herein. In addition to establishing communications, one or more of the devices can perform image capture 606 to attempt to capture, for example, persons or objects within a vicinity of those devices. For each device capturing image information (e.g., still or video), the image information can be analyzed to attempt to determine a relative position and identity of each person in the image information 608. As discussed, this can include performing image recognition on any object resembling a human and calculating, based upon an orientation of the imaging element capturing the image and a location of the person in the image information, a relative position of that person with respect to the device. In addition, the relative positions of the devices can be determined 610. In some embodiments the relative positions of the devices can also be determined using the captured image information, such as by using the relative position of each face to a given device, while in other embodiments other processes can be used, such as by signal triangulation, vibration detection, time of flight determinations, etc.

Once the position information is determined, the information from the various devices can be aggregated and used to generate a mapping of relative positions 612. As discussed, this can involve anything from an ordering or relative direction to each user to a full three-dimensional mapping of the relative positions of the users, devices, and other nearby objects. On at least one device, the relative locations and identities of at least a portion of the users, objects, devices, or other such elements can be displayed 614, enabling the user to provide input with respect to any of those elements. As discussed, this can involve transferring information to a particular device, providing audio or video capture, etc.

Figure 7:
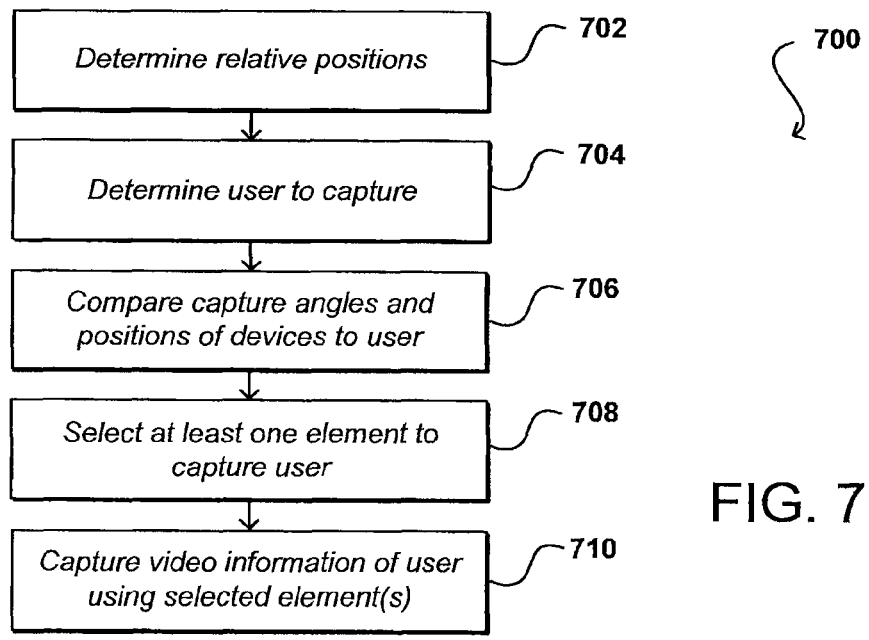
FIG. 7 illustrates an example process for obtaining location specific-image capture that can be used in accordance with various embodiments.

FIG. 7 illustrates an example process 700 where the user requests video capture of an identified person in accordance with one embodiment. In this example, the relative positions and identities of the persons are determined 702 using a process such as that described with respect to the process of FIG. 6. A user to capture in video information can be determined 704, such as by a user specifically selecting an icon or image for that user on a display element or a device detecting that user speaking or making a motion (i.e., such as for gesture input). In at least some embodiments the person to capture can be inferred using any appropriate mechanism, such as by monitoring the position of the heads of other persons nearby to determine the person at whom they are all looking, who is moving their lips, who has a spotlight or video camera pointed at them, etc. The relative position of that selected person then can be compared against the capture angles and locations of the various video capture elements of the communicating devices 706. Using a process discussed elsewhere herein, a consensus can be reached wherein at least one video capture element is selected 708 that is able to capture video of the selected user. The video of the user then can be captured using that element 710, at least until another selection is made, the user quits making a motion, a gesture is detected, or another such event occurs. In at least some embodiments, the video captured using the selected elements is then automatically stored as a single file at an appropriate time, such as at the end of a recording at the current location, end of a meeting, etc. Various other actions can be taken as well as discussed elsewhere herein. For example, the video information from the multiple devices can be aggregated to improve the quality of the video, can be stitched together to provide a larger video image, etc.

Figure 8:
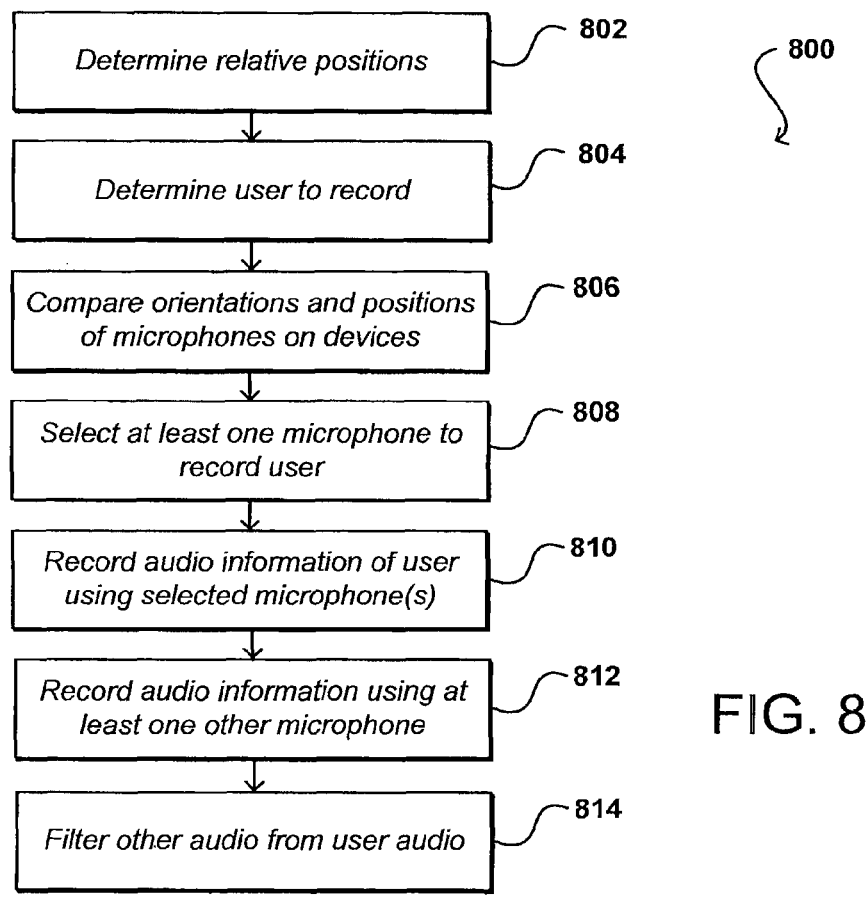
FIG. 8 illustrates an example process for obtaining location-specific audio capture that can be used in accordance with various embodiments.

FIG. 8 illustrates an example process 800 wherein the user instead selects to record audio information for a specific person. In this example, the relative positions and identities of the persons are determined 802 and a person to record is determined 804, as discussed above. The positions and/or directions of the various microphones or other audio capture elements of the various devices are compared to the position of the selected user 806, and using a process discussed elsewhere herein at least one audio capture element is selected to record the user 808. The selected elements then capture audio of that user 810, at least until an event occurs that stops the audio capture. During the audio capture, audio information can be recorded using at least one other audio capture element 812, such as an element that is further away from the person and/or pointing in a different direction. This audio from the other microphone(s) then can be used to filter background noise from the captured audio of the person 814, in order to improve audio quality. Various other approaches can be used as well within the scope of the various embodiments.

As mentioned, various other functions can be provided by enabling multiple devices to collaborate as discussed herein. For example, image information from the various devices can be stitched together to provide a larger and/or higher resolution image with a larger capture range than would be possible with a single camera. Similarly, audio from multiple directions can be recorded with directional information in order to recreate sound in three dimensions upon playback. In situations where power and/or resource conservation is a goal, a single element can be selected to capture audio, image, and/or video information even if there are multiple elements capable of capturing such information based on their position and orientation. Similarly, multiple elements can be selected to capture specific information where improved accuracy is a goal. In some cases where privacy settings allow, crowd-sourced recording can be utilized, wherein multiple devices can combine information when their users allow such activities. This can enable position-dependent sound recording, three-dimensional image capture, and various other functionality. Such capture might be desirable for various types of event, which then can potentially be uploaded to a social networking site or otherwise shared with others.

For processes such as facial recognition and voice recognition where privacy may be of concern, each device can store its own user information. For example, image information of a user captured by another device might only be able to be processed by a device owned by that user. In some embodiments, the device can transfer identity information to a specific device only when granted permission by the user.

As discussed, user motion captured by a device can be used to provide gesture input. Examples of gesture input are provided, for example, in co-pending U.S. patent application Ser. No. 12/332,049, filed Dec. 10, 2008, and entitled "Movement Recognition as Input Mechanism," which is hereby incorporated herein by reference. In at least some embodiments, a user can provide gesture input to that user's device even if that device is unable to capture image information of the gesture, as long as that user can be identified and imaged by another device in communication with the user's device. In some embodiments, multiple devices capturing the gesture can analyze the gesture and attempt to come to a consensus as to the type of gesture, in order to improve accuracy and allow for more complex motions viewable from multiple angles. Similarly, people in a room can vote by raising their hand, take control of a presentation by making a motion, or perform any of a number of other such actions as long as at least one of the communicating devices is able to detect and analyze the motion. In many situations, the users might not even need to be in the same room, as long as the devices can determine their relative positions and at least one device can view each user.

Figure 9:
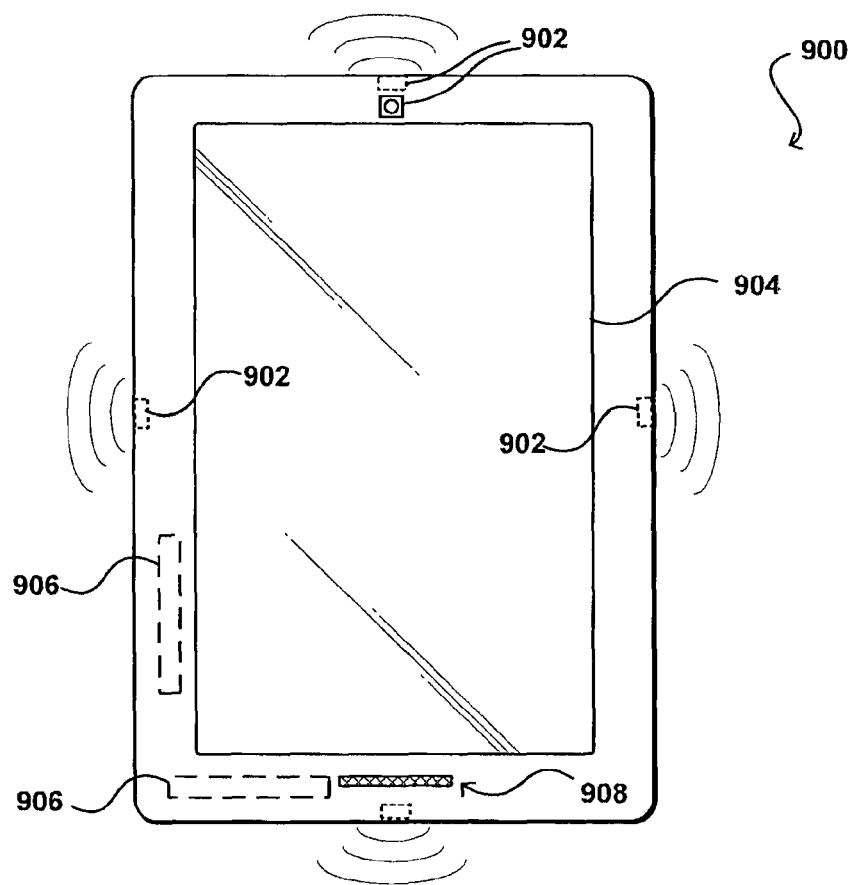
FIG. 9 illustrates an example computing device that can be used in accordance with various embodiments.

FIG. 9 illustrates an example computing device 900 that can be used to perform such a method in accordance with various embodiments. In this example, the device has multiple image capture elements 902 on various sides of the device, enabling the device to capture image information in various directions around the device. The device also includes at least one display element 904 enabling the user to view information determined about nearby users or objects as discussed elsewhere herein. While the image capture elements discussed herein are generally referred to as cameras or other such elements, it should be understood that other types of image capture elements, such as infrared (IR) sensors and motion detectors, can be used as well within the scope of the various embodiments. There also can be one or more illumination elements (not shown) to assist with image capture. The device can include at least one audio capture element 908, such as a microphone, for recording audio information near the device. The device can also include additional elements 906, such as an orientation-determining element to detect changes in device orientation, a wireless communication element to enable communications with other devices, etc.

Figure 10:
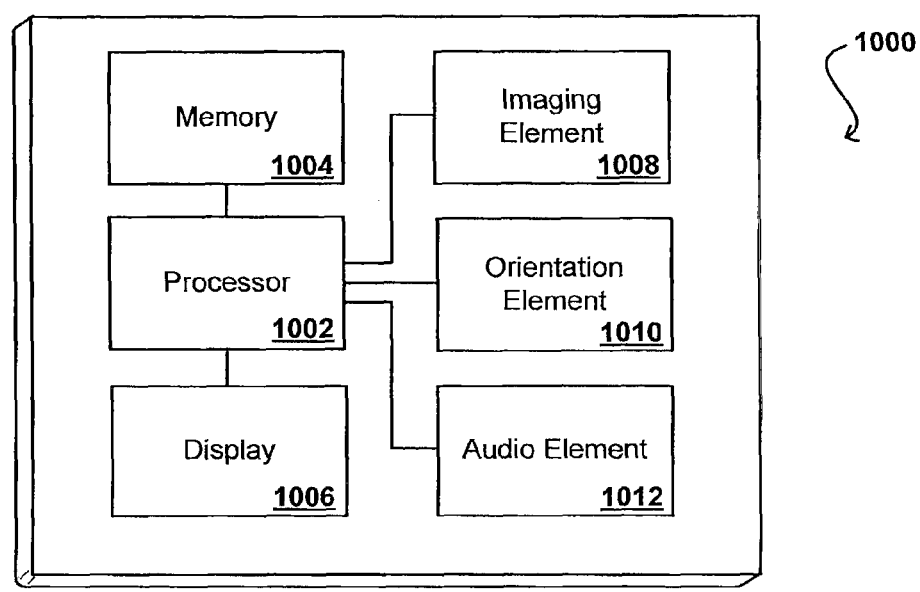
FIG. 10 illustrates an example combination of components of a computing device, such as that illustrated in FIG. 9, that can be used in accordance with one embodiment.
Figure 11:
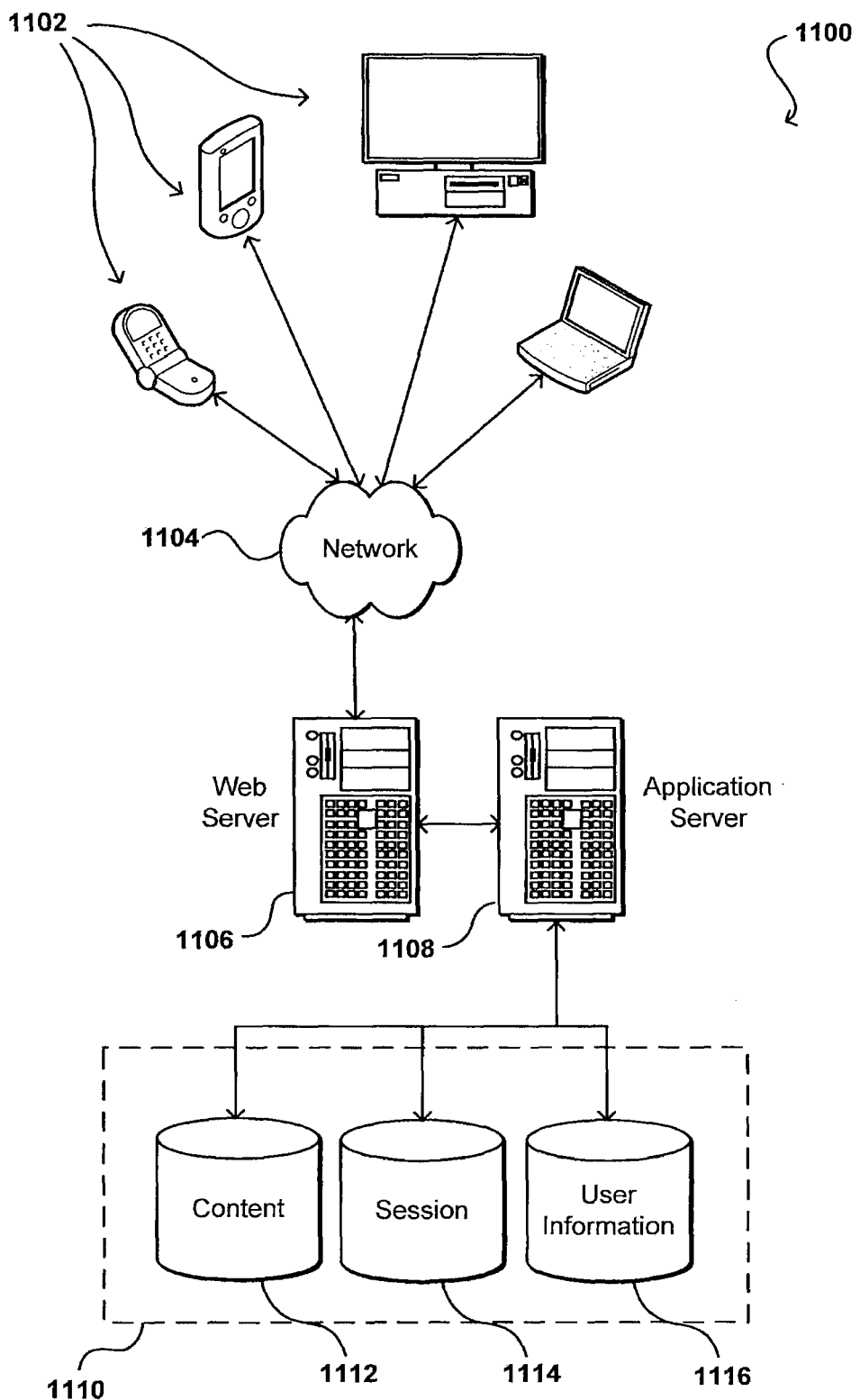
FIG. 11 illustrates an example environment in which various embodiments can be implemented.

In order to provide various functionality described herein, FIG. 10 illustrates an example set of basic components of a computing device 1000, such as the device 900 described with respect to FIG. 9. In this example, the device includes at least one central processor 1002 for executing instructions that can be stored in at least one memory device or element 1004. As would be apparent to one of ordinary skill in the art, the device can include many types of memory, data storage or computer-readable storage media, such as a first data storage for program instructions for execution by the processor 1002, the same or separate storage can be used for images or data, a removable storage memory can be available for sharing information with other devices, etc. The device typically will include some type of display element 1006, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 1008, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one orientation-determining component 1010, such as an accelerometer, electronic gyroscope, or inertial sensor, enabling the device to determine changes in orientation. The device also can include at least one audio capture element 1012, as may include one or more microphones or other such elements.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of interacting with a computing device, comprising:
    capturing a first image using a first camera of the computing device;
    analyzing the first image to determine first information relating to at least one first position and at least one first identity of at least one first person at least partially represented in the first image;
    sending the first information to at least one second computing device, the computing device being proximate to the at least one second computing device;
    receiving, from the at least one second computing device, second information relating to at least one second position and at least one second identity of at least one second person at least partially represented in a second image captured by a second camera of the at least one second computing device;
    determining a relative position of the at least one second computing device with respect to the computing device; and
    aggregating the first information, the second information, and the relative position of the at least one second computing device with respect to the computing device to generate a mapping of relative positions of each identified person with respect to the computing device,
    wherein the computing device is able to determine the relative position of each identified person independent of whether the computing device is able to capture one or more images that include a representation of at least a portion of the identified person at a current position of the computing device.

2. The computer-implemented method of claim 1, further comprising:
    displaying information associated with each identified person on a display element of the computing device, the information being presented in a manner such that a relative location of the information for each identified person corresponds to the relative position of the identified person with respect to the computing device.

3. The computer-implemented method of claim 2, further comprising:
    enabling a user of the computing device to interact with the at least one second computing device by selecting information associated with a selected identified person on the computing device.

4. The computer-implemented method of claim 3, wherein enabling the user of the computing device to interact with the at least one second computing device includes enabling the user to send data to, and receive the data information from, the at least one second computing device.

5. A computer-implemented method of identifying people using a computing device, comprising:
    capturing a first image using a camera of the computing device;

analyzing the first image to determine first information relating to at least one first position of at least one first person at least partially represented in the first image;

receiving, from at least one second computing device, second information relating to at least one second position of at least one second person at least partially represented in a second image captured by a second camera of the at least one second computing device, the computing device being proximate to the at least one second computing device; and aggregating the first information and the second information, wherein the computing device is able to determine a position of each person at least partially represented in one or more images captured by any of the computing device and the at least one second computing device independent of whether the computing device is able to capture the one or more images to include a representation of at least a portion of the person at a current position of the computing device.

6. The computer-implemented method of claim 5, further comprising:

sending the first information to the at least one second computing device, wherein the at least one second computing device is able to determine the position of each person at least partially represented in the one or more images captured by any of the computing device and the at least one second computing device independent of whether the at least one second computing device is able to capture the one or more images to include the representation of the at least a portion of the person at a second current position of the at least one second computing device.

7. The computer-implemented method of claim 5, wherein the first information and the second information are used to determine a relative ordering, a relative position, or a mapping of positions of each person at least partially represented in the one or more images captured by any of the computing device and the at least one second computing device.

8. The computer-implemented method of claim 5, wherein aggregating the first information and the second information includes:

identifying at least one object visible to each of the computing device and the at least one second computing device; and using the at least one object as a frame of reference for relative position.

9. The computer-implemented method of claim 8, wherein the at least one object is used to determine relative positions among the computing device and the at least one second computing device at least in part by calculating the relative position of each of the computing device and the at least one second computing device with respect to the at least one object.

10. The computer-implemented method of claim 5, wherein the one or more images captured by any of the computing device and the at least one second computing device are capable of being aggregated by at least one of the computing device or the at least one second computing device to generate a shared view of an area surrounding the computing device and the at least one second computing device.

11. The computer-implemented method of claim 10, wherein aggregation of the one or more images is performed using at least one of the computing device, the at least one second computing device, or a remote system operable to receive the one or more images over a network.

12. The computer-implemented method of claim 5, wherein any object within a capture area of at least one of the computing device or the at least one second computing device is able to be imaged and a position determined with respect to any of the computing device and the at least one second computing device.

13. The computer-implemented method of claim 5, further comprising:

determining at least one first identity of the at least one first person at least partially represented in the first image information, wherein the at least one first identity of the at least one first person is determined on the computing device by performing image recognition on the computing device and comparing the first image to stored user identity information.

14. The computer-implemented method of claim 13, wherein the stored user identity information is stored only on the computing device.

15. The computer-implemented method of claim 14, wherein the stored identity user information is provided to the at least one second computing device only if the computing device receives permission from the at least one first person.

16. A computer-implemented method of capturing information using multiple computing devices, comprising:

determining component information relating to at least one of available audio components and available video components across a first computing device and at least one second computing device, the first computing device being proximate to the at least one second computing device;

determining a position of at least one object for which at least one of audio information or video information is to be captured; and selecting at least one available audio component or video component to capture information associated with the at least one object based at least in part upon the position of the at least one object, a type of information to be captured, and the component information, wherein the at least one available audio component or video component is capable of being selected on any one or more of the first computing device and the at least one second computing device.

17. The computer-implemented method of claim 16, wherein the at least one object includes at least one person within a capture range of at least one of the first computing device or the at least one second computing device.

18. The computer-implemented method of claim 16, wherein the type of information includes video, and selecting the at least one available audio component or video component includes selecting a video camera on at least one of the first computing device or the at least one second computing device that includes the at least one object within a capture range of the video camera.

19. The computer-implemented method of claim 16, wherein the type of information includes audio, and selecting the at least one available audio component or video component includes selecting a microphone on at least one of the first computing device or the at least one second computing device that is nearest to the at least one object.

20. The computer-implemented method of claim 19, further comprising:

selecting at least one additional microphone oriented to capture second audio information from at least one direction away from the at least one object; and using the second audio information to filter background noise from the at least one of the audio information or video information.

21. A computing device, comprising:
a processor;
a camera; and
a memory device including instructions that, when executed by the processor, cause the client device to:
capture a first image using the camera;
analyze the first image to determine first information relating to at least one first position of at least one first person at least partially represented in the first image;
receive, from at least one second computing device, second information relating to at least one second position for at least one second person at least partially represented in a second image captured by a second camera of the at least one second computing device, the computing device being proximate to the at least one second computing device; and
aggregate the first information and the second information,
wherein the computing device is able to determine a position of each person at least partially represented in one or more images captured by any of the computing device and the at least one second computing device independent of whether the computing device is able to capture the one or more images to include a representation of at least a portion of the person at a current position of the computing device.

22. The computing device of claim 21, wherein the instructions when executed further cause the computing device to:
send the first information to the at least one second computing device,
wherein the at least one second computing device is able to determine the position of each person at least partially represented in the one or more images captured by any of the computing device and the at least one second computing device independent of whether the at least one second computing device is able to capture the one or more images to include the representation of the at least a portion of the person at a second current position of the at least one second computing device.

23. The computing device of claim 21, wherein the instructions when executed further cause the computing device to:
determine at least one first identity of the at least one first person at least partially represented in the first image,
wherein the at least one first identity of the at least one first person is determined on the computing device by performing image recognition on the computing device and comparing the first image to stored user identity information, the stored user identity information being stored only on the computing device.

24. A non-transitory computer-readable storage medium storing instructions for automatically identifying proximate devices, the instructions when executed by a processor of a computing device causing the computing device to:
capture a first image using a camera of the computing device;
analyze the first image to determine first information relating to at least one first position of at least one first person at least partially represented in the first image;
receive, from at least one second computing device, second information relating to at least one second position for at least one second person at least partially represented in a second image captured by a second camera of the at least one second computing device the computing device being proximate to the at least one second computing device; and
aggregate the first information and the second information,
wherein the computing device is able to determine a position of each person at least partially represented in one or more images captured by any of the computing device and the at least one second computing device independent of whether the computing device is able to capture the one or more images to include a representation of at least a portion of the person at a current position of the computing device.

25. The non-transitory computer-readable storage medium of claim 24, wherein the first information and the second information are used to determine a relative ordering, a relative position, or a mapping of positions of each person at least partially represented in the one or more images captured by any of the computing device and the at least one second computing device.

26. The non-transitory computer-readable storage medium of claim 24, wherein the instructions when executed to cause the computing device to aggregate the first information and the second information include causing the computing device to:
identify at least one object visible to each of the computing device and the at least one second computing device; and
use the at least one object as a frame of reference for relative position.

27. The non-transitory computer-readable storage medium of claim 26, wherein the at least one object is used to determine relative positions among the computing device and the at least one second computing device at least in part by calculating the relative position of each of the computing device and the at least one second computing device with respect to the at least one object.

* * * * *